(12) United States Patent
Sticht

(10) Patent No.: US 9,251,543 B2
(45) Date of Patent: Feb. 2, 2016

(54) PREDICTIVE METHOD, APPARATUS AND PROGRAM PRODUCT

(76) Inventor: Christopher Sticht, Raleigh, NC (US)

( * ) Notice: Subject to any disclaimer, the term of this patent is extended or adjusted under 35 U.S.C. 154(b) by 648 days.

(21) Appl. No.: 13/530,063

(22) Filed: Jun. 21, 2012

(65) Prior Publication Data

US 2013/0346034 A1  Dec. 26, 2013

(51) Int. Cl.
*G06Q 50/06* (2012.01)
*G06Q 30/02* (2012.01)
*H02J 3/00* (2006.01)

(52) U.S. Cl.
CPC ............... *G06Q 50/06* (2013.01); *G06Q 30/02* (2013.01); *G06Q 30/0202* (2013.01); *H02J 3/00* (2013.01); *H02J 2003/003* (2013.01); *H02J 2003/007* (2013.01); *Y02E 60/76* (2013.01); *Y04S 10/54* (2013.01); *Y04S 40/22* (2013.01); *Y04S 50/14* (2013.01)

(58) Field of Classification Search
CPC ......... G06F 17/00; G06F 17/60; G06F 15/18; G06F 17/50; G06Q 40/06; G06N 5/02; H02J 13/00; H02J 3/00
USPC ......... 703/2; 700/291; 705/412, 36 R; 706/12
See application file for complete search history.

(56) References Cited

U.S. PATENT DOCUMENTS

| | | | |
|---|---|---|---|
| 5,491,629 A * | 2/1996 | Fox et al. | 702/3 |
| 6,577,962 B1 * | 6/2003 | Afshari | 702/61 |
| 2004/0254899 A1 * | 12/2004 | Abe et al. | 705/412 |
| 2006/0167591 A1 * | 7/2006 | McNally | 700/291 |
| 2011/0060703 A1 * | 3/2011 | Alaniz | 706/12 |
| 2011/0190951 A1 * | 8/2011 | Lee | 700/291 |
| 2012/0173456 A1 * | 7/2012 | Hirl | 705/36 R |

FOREIGN PATENT DOCUMENTS

EP  2312506 A1 *  4/2011

OTHER PUBLICATIONS

Abu-Shikhah et al., Medium-Term Electric Load Forecasting Using Multivariable Linear and Non-Linear Regression, Smart Grid and Renewable Energy, May 2011.*
Filik et al., A Novel Modeling Approach for Hourly Forecasting of Long-Term Electric Energy Demand, Energy Conversion and Management 52, available online Jul. 17, 2010.*
Migon et al., Modeling and Forecasting Intraday Electricity Load, Feb. 2012.*
Wikipedia, "Degree of Polynomila", Sep. 2015.*
AlHarbi et al., "Mathematical Analyses of Dental Arch Curvature in Normal Occlusion", Angle Orthodontist, 2008.*
BBlakemore et al., "Computer Fitting of Germanium Thermometer Characteristics", The Review of Scientific Instruments, Jun. 1970.*
Gersten et al., "Statistical Properties of Orbit Perturbations Induced by the Earth's Anomalous Gravity", AIAA 5th Aerospace Sciences Meeting, New York, Jan. 23-26, 1967.*
Stevenson, A.F., "On the Theoretical Determination of Earth Resistance from Surf ace Potential Measurements", Physics, 1934.*
Christopher Sticht, Atilda-USPTO, Jul. 2015, 73 pages, unpublished presentation prepared for interview discussion.

* cited by examiner

*Primary Examiner* — Kandasamy Thangavelu
(74) *Attorney, Agent, or Firm* — Daniel E. McConnell

(57) ABSTRACT

Methods, Apparatus and Program Products for predicting resource usage data, weather data and econometric data, such as: demands on resources such as electrical power, water supply, communications infrastructure; temperature, humidity, wind speed, solar radiation, and degree days; and commodity price, gross domestic product, and a price index.

21 Claims, 4 Drawing Sheets

PREDICTIVE METHOD, APPARATUS AND PROGRAM PRODUCT

FIELD AND BACKGROUND OF INVENTION

Prediction of demands on resources such as electrical power, water supply, communications infrastructure and the like is of importance to planners for utilities and other bodies concerned with growth and meeting the demands of growth. Technologies for such predictions have existed and are in use, and have been found to suffer deficiencies in adaptability to data capture and analysis. Typically, such techniques have provided some reliable accuracy over limited spans of time and little or no accuracy over longer spans of time.

Referring to the electrical utility industry as an example, one of the key pieces of data used by electric system planners is load data. Planners have been using system peak usage hour data to plan the system. The system peak load hour data is weather adjusted to represent what load might be expected on a day that has the highest ambient temperature of any day for the past 10 or 20 years.

System peak hour data has been sufficient for planning the electric grid until now due to planners allowing for substantial margin for error. However, with the changing electric utility environment it is becoming necessary to get more usage of the existing infrastructure. As a consequence, there is greater need to have greater understanding about the electrical loading on different equipment such as transformers, feeder lines, and customer transformers.

A summer peaking system will typically see its peak load demand in the summer, perhaps in August or September, typically at 5 or 6 pm. It is well understood in the electric utility industry that not all loads see their peak usage at the same time of the day or on the same day of the year.

There is a great deal known about electric loads, but there has not yet been a way to cleanly represent the "typical" electrical demand in the form of an equation. There are several forecasting algorithms which will forecast load in the short term of 24-48 hours or the long term for an area using spatial load forecasting which will look out several years. However, there has been little done to forecast with much accuracy out 12 to 24 months.

Many of the methodologies for short and very long term forecasting use mathematical methodologies such as fuzzy logic, neural nets, stochastics and state estimation. The short term forecasting results of some of these methodologies can be quite accurate, but the accuracy drops off dramatically once they look past a week or two.

There has been a need to see past a week or two, but nothing has been found to work with sufficient accuracy, reliability and simplicity to be of much use to those who plan the electric grid. What is presented here is a methodology that is both simple enough and accurate enough to be of value for planning the power grid over the next one to two years. One to two years is the time frame of interest to a majority of distribution electric system planning which is also where a significant portion of the annual capital budget is spent.

What is here disclosed and taught is a new technology for such predictions which relies upon and implements a topologic space and surface analysis enabling insertion of future dates and generation of more accurate predictive values for resource demand.

SUMMARY OF THE INVENTION

A method is implemented in a computer system which has a processor, memory accessible to the processor, and executable program code accessible to the processor. Data is stored in the memory for a plurality of sequential events related to resource usage. Using the executable program and the stored data, the computer system generates a topologic space and a polynomial equation defining the surface of the topologic space. Using the equation, the computer system generates a predicted value for a future event.

It is also contemplated that an apparatus in the form of a computer system performs the analysis and prediction under the control of a program product and that such a program product is provided for implementation as program code stored on a tangible computer readable medium such as an optical disc.

BRIEF DESCRIPTION OF DRAWINGS

Some of the purposes of the invention having been stated, others will appear as the description proceeds, when taken in connection with the accompanying drawings, in which.

DETAILED DESCRIPTION OF INVENTION

While the present invention will be described more fully hereinafter with reference to the accompanying drawings, in which preferred embodiments of the present invention are shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

Figure 1:
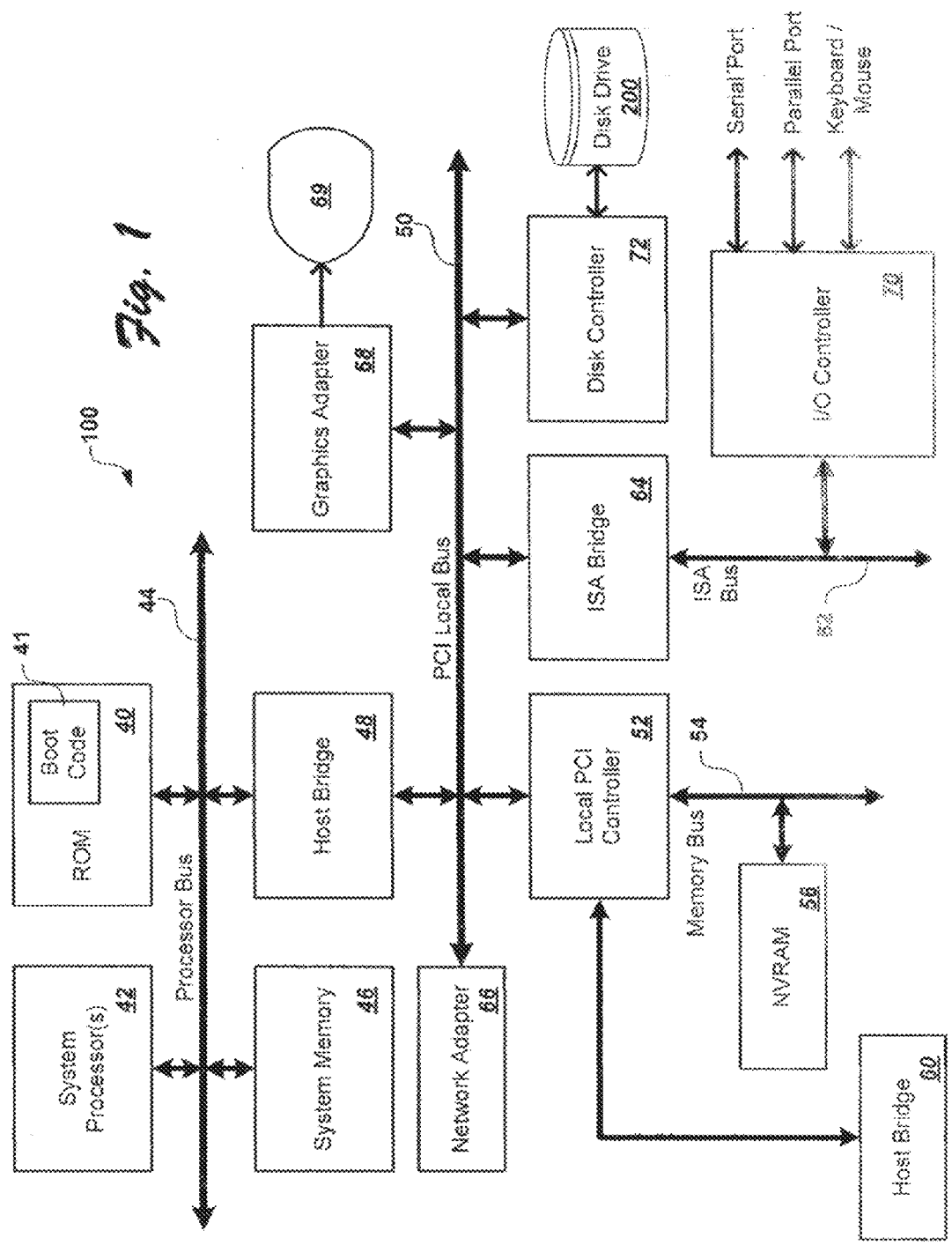
FIG. 1 is an exemplary representation of a computer system.

Referring now to FIG. 1, what is there shown and will be here described is an example of a computer system useful in practicing this technology. It will be understood by knowledgeable readers that computer systems vary in complexity, size and capability. The showing and description here should thus be understood as an example only. It is contemplated that the techniques will be implemented through the available range of computing apparatus.

FIG. 1 is a block diagram of a computer system 100 according to a preferred embodiment of the present invention which incorporates at least one system processor 42, which is coupled to a Read-Only Memory (ROM) 40 and a system memory 46 by a processor bus 44. System processor 42 is a general-purpose processor that executes boot code 41 stored within ROM 40 at power-on and thereafter processes data under the control of operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 100 to a Local Area Network, and graphics adapter 68, which interfaces computer system 100 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 100 further includes Industry Standard Architecture (ISA) bus 62, which is coupled to PCI local bus 50 by ISA bridge 64. Coupled to ISA bus 62 is an input/output (I/O) controller 70, which controls communication between computer system 100 and attached peripheral devices such as a keyboard, mouse, and a disk drive. In addition, I/O controller 70 supports external communication by computer system 100 via serial and parallel ports.

The technique of the present invention, implemented in a computer system such as that described, is a method which stores in the system memory data defining a plurality of sequential events, each event identified by three coordinate values. In most resource usage prediction applications, the data will be usage or demand levels, day and hour. The day is preferably recorded as simply the day of a year, from 1 to 365 (or 366 in the event of a leap year). Hour is preferably recorded simply as hour of day on a twenty four hour clock. Thus the series of sequential events may be 8760, for hourly data for a year. However, as will become clear from what follows, other intervals may be selected while the technique remains applicable. Thus if the usage demands suggest or require, data may be captured on a quarter hour or minute by minute basis. The range of sequential events is from eight thousand to six hundred thousand events recorded in data.

Figure 3:
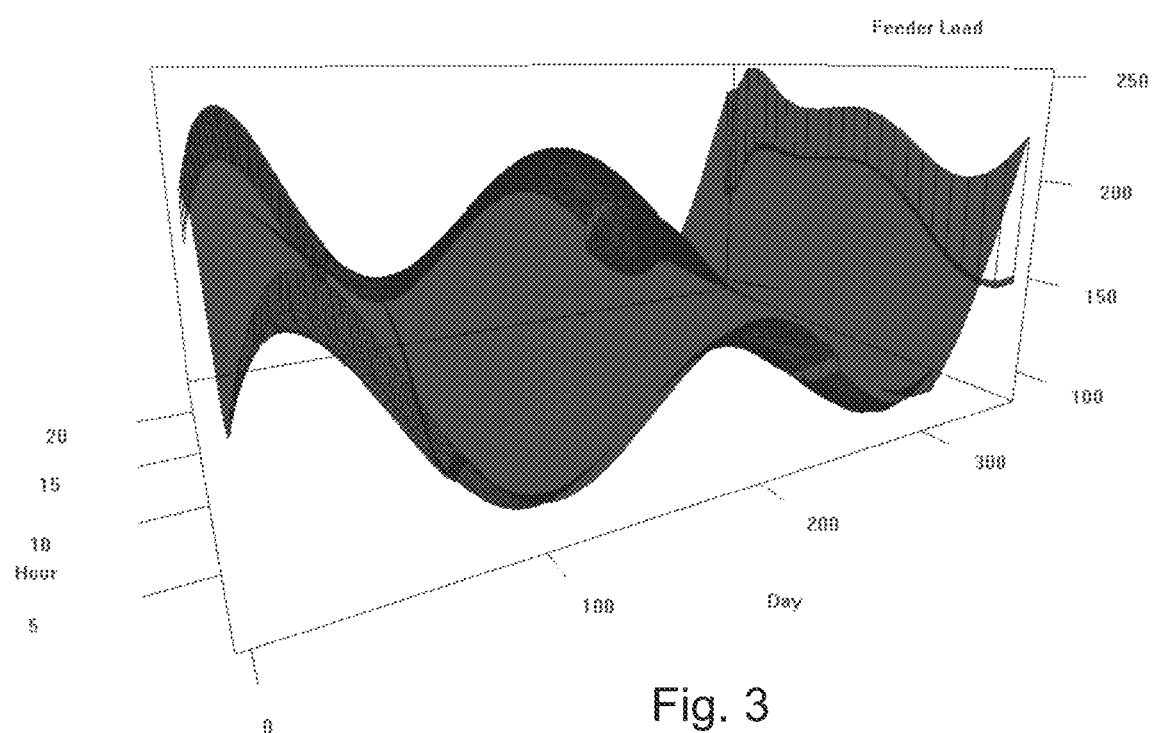
FIG. 3 is a representation of a three dimensional topologic surface generated from electrical load data.

In any event, by executing program code written in accordance with this invention on the processor and using the stored data, a three dimensional topologic space is generated. In generating this space, day may be plotted along an X axis, for example, while hour is plotted along a Y axis and resource usage or demand is plotted along a Z axis. From the generated space, a polynomial equation is generated which defines the topologic surface or space (See FIG. 3). The illustrated topologic surface is a sheet. Mathematicians will recognize that such surfaces and spaces may take other forms, such as helices, cylinders, cones and the like. As used here, the terms "topologic space" and "topologic surface" are intended to have the broad meaning understood by mathematicians. Then, applying the equation, a predicted value for a future event coordinate value is generated. This is done in a computer apparatus where a processor executes program code, as a method where the operations are performed by a computer system, and when a program product is accessed and executed by a computer system.

As applied particularly to the electrical utility industry, the methodology presented here forms a single discrete variable equation that represents load for electric distribution system loads with accuracy sufficient to be of value. The equation is in the form of a single polynomial equation where each polynomial coefficient can be interpreted in such a way as to provide deeper understanding of the load behavior.

Another value to having the load represented by a single equation is that the load for 8760 hours of data points can be represented as 49 coefficients with high accuracy.

1. Read one year of hourly load data (8760 hours)
   a. convert data to:
      I. hour of day
      ii. day of year
   b. organize into three columns organized by hour of year
      I. X=day of year
      ii. Y=hour of day
      iii. Z=load reading for hour
2. Calculate coefficients by performing a multiple regression on X, Y, Z using one of the following forms of regression:
   I. least squares regression
   ii. robust regression
   iii. resistant regression
   a. use equation
      4th or 6th order 3 dimensional polynomial (topologic surface)

$$z = B0 + B1*x + B2*x^2 + B3*x^3 + B4*x^4 + B5*x^5 + \\ B6*x^6 + B7*y + B8*x*y + B9*x^2*y + B10*x^3*y + \\ B11*x^4*y + B12*x^5*y + B13*x^6*y + B14*y^2 + \\ B15*x*y^2 + B16*x^2*y^2 + B17*x^3*y^2 + \\ B18*x^4*y^2 + B19*x^5*y^2 + B20*x^6*y^2 + \\ B21*y^3 + B22*x*y^3 + B23*x^2*y^3 + \\ B24*x^3*y^3 + B25*x^4*y^3 + B26*x^5*y^3 + \\ B27*x^6*y^3 + B28*y^4 + B29*x*y^4 + \\ B30*x^2*y^4 + B31*x^3*y^4 + B32*x^4*y^4 + \\ B33*x^5*y^4 + B34*x^6*y^4 + B35*y^5 + \\ B36*x*y^5 + B37*x^2*y^5 + B38*x^3*y^5 + \\ B39*x^4*y^5 + B40*x^5*y^5 + B41*x^6*y^5 + \\ B42*y^6 + B43*x*y^6 + B44*x^2*y^6 + \\ B45*x^3*y^6 + B46*x^4*y^6 + B47*x^5*y^6 + \\ B48*x^6*y^6$$

where the B's are the coefficients calculated by the regression.

The calculated coefficients then are used to calculate predictions for resource usage/demands (such as electrical loads) based on the equation for the topologic surface. Predicted values may be used to fill in any gaps in data resulting from missed observations. For missing data values in the current year, all that is required is to plug the day and hour of the missing value into the equation for the current year. The result is the estimation for that hour's missing value. The equation coefficients can be calculated even with several hours of load data missing. It is believed that all that is absolutely required is 50 load readings. Although, to get more accuracy in the calculated coefficients it is best to have a couple of thousand load readings out of the 8760 hours in the year. The more load readings there are in the original calculation of the coefficients the better estimations will be.

The load surface for each system component (i.e. customer load, transformer load, feeder load, substation load) is different but the topologic space and surface for each component has a characteristic shape represented by a unique set of polynomial coefficients. The characteristic polynomial coefficient set is used to represent a normalized data curve for each system component in a compact form. By storing and presenting the characteristic coefficients for each system component, insight can be gained into the load behavior without having to individually analyze all 8760 original data points.

In the context of electrical utility planning, other and further uses of the technique include adding the forty nine values of the calculated coefficients for differing load sets (feeders, transformers, etc.) to make comparisons which are useful in distribution analyses.

The coefficients of the three dimensional topologic surface are a very good representation of a system component being studied. In the electrical utility context, the coefficient B0 may represent base component load. Annual load growth may be observed on the coefficient B1.

Polynomials may be multiplied to find system losses by:
a. calculating the coefficients for the two polynomials that need to be multiplied
b. calculating the predicted values for both polynomials based on the calculated coefficients
c. multiplying values for each set of predicted values
d. calculating the coefficients of the multiplied data sets based on the multiplied pairs using the same least squares regression This last mentioned methodology is particularly important when calculating $I^2R$ losses for power lines.

Figure 2:
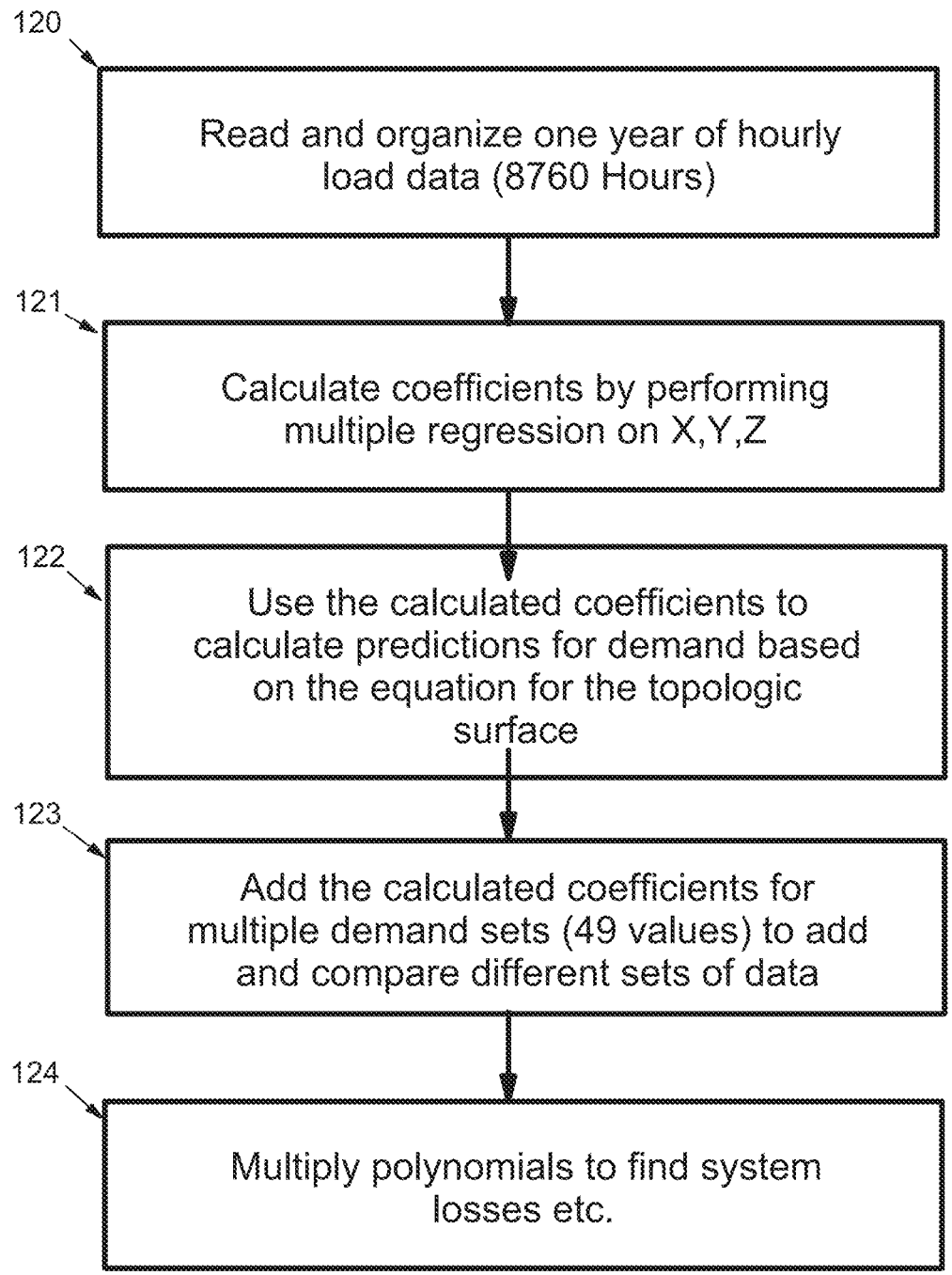
FIG. 2 is a flow chart showing the implementation of the present invention in an electrical load resource demand application.

The process is summarized in the chart of FIG. 2. There, the steps are, at 120, to read and organize the data to be studied. Then, at 121, calculate the coefficients by performing a regression on the X, Y, Z terms of the three dimensional topologic space. At 122, use the calculated coefficients to perform predictions. At step 123, add the calculated coefficients to compare differing sets of data. And at 124, multiply the polynomials if desired.

A matrix of the coefficients is:

TABLE 1

|         | 1   | X   | $X^2$ | $X^3$ | $X^4$ | $X^5$ | $X^6$ |
|---------|-----|-----|-------|-------|-------|-------|-------|
| 1       | B0  | B1  | B2    | B3    | B4    | B5    | B6    |
| Y       | B7  | B8  | B9    | B10   | B11   | B12   | B13   |
| $Y^2$   | B14 | B15 | B16   | B17   | B18   | B19   | B20   |
| $Y^3$   | B21 | B22 | B23   | B24   | B25   | B26   | B27   |
| $Y^4$   | B28 | B29 | B30   | B31   | B32   | B33   | B34   |
| $Y^5$   | B35 | B36 | B37   | B38   | B39   | B40   | B41   |
| $Y^6$   | B42 | B43 | B44   | B45   | B46   | B47   | B48   |

Prediction is accomplished by using the equation above. Calculating the result of the equation using x (the day of the year)=365 and y (the hour of the day)=24 gives a result for z (the load). This is the final load for the year. The following year then starts with this value. Therefore, the intercept coefficient (B0) for the equation for the second year is equal to the final hour load calculated from the first year. Once the intercept for the equation for year two is calculated, then the equation for year two is established (all other coefficients stay the same). With the year two equation, any hour load for that year can be estimated by using x=chosen day and y=chosen hour. Load estimation can be improve by incorporating equations for weather, economics etc.

While much of the discussion to this point has reflected application of the method, apparatus and program product of this invention in electrical utility planning, it is to be understood that application is contemplated in additional predictive uses. In particular, it is contemplated that the data defining a plurality of sequential events is a selected one from a group consisting of resource usage data, weather data and econometric data. Within this grouping, the data can be selected to be resource usage data which is a selected one from a group consisting of electrical load data, water usage data, and communication equipment usage data. As to weather data, the data can be selected from a group consisting of temperature, humidity, wind speed, solar radiation, and degree days. When econometric data is the focus, the data is a selected one from a group consisting of commodity price, gross domestic product, and a price index. Each of these groupings is illustrative, as persons of skill implementing this technology will be able to discern additional applications not specifically identified here.

Figure 4:
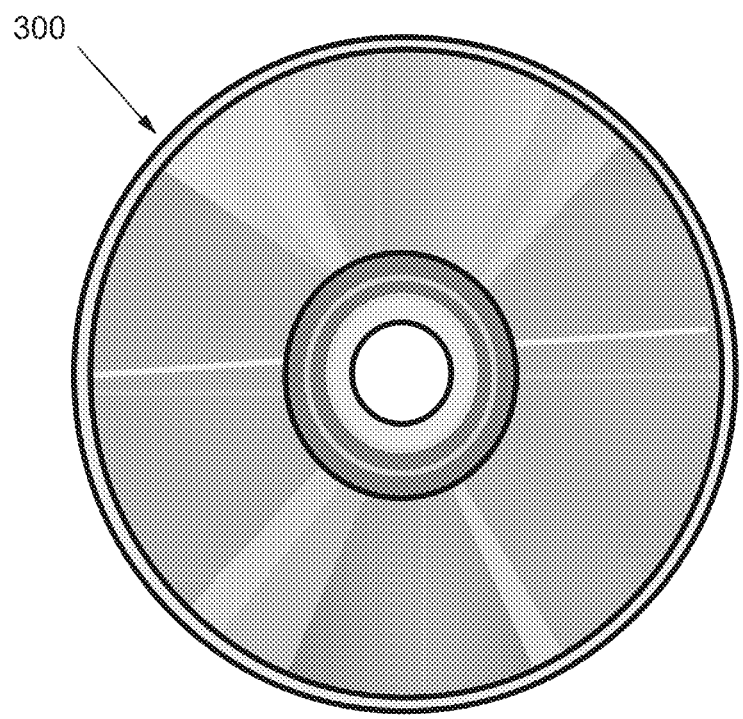
FIG. 4 is a representation of a tangible computer readable medium bearing executable program code which will implement the techniques here described.

Referring now to FIG. 4, one or more aspects of the present invention can be included in an article of manufacture (e.g., one or more computer program products) having, for instance, tangible computer usable media, indicated at 300 in FIG. 4. The media has embodied therein, for instance, computer readable program code for providing and facilitating the capabilities of the present invention. The article of manufacture can be included as a part of a computer system or sold separately. Machine readable storage mediums may include fixed hard drives, optical discs such as the disc 300, magnetic tapes, semiconductor memories such as read only memories (ROMs), programmable memories (PROMs of various types), flash memory, etc. The article containing this computer readable code is utilized by executing the code directly from the storage device, or by copying the code from one storage device to another storage device, or by transmitting the code on a network for remote execution.

In the drawings and specifications there has been set forth a preferred embodiment of the invention and, although specific terms are used, the description thus given uses terminology in a generic and descriptive sense only and not for purposes of limitation.

What is claimed is:

1. A method implemented in a computer system having a processor, memory accessible to the processor, and executable program code accessible to the processor, the method comprising:
   storing in the memory data defining a plurality of sequential events, each event identified by three coordinate values, the three coordinate values being day of year, hour of day and resource usage;
   generating from the stored coordinate values by execution of the program code by the processor a three dimensional topologic surface by plotting the resource usage against the day of the year and the hour of the day in a three dimensional space;
   generating by execution of the program code by the processor a polynomial equation defining said topologic surface wherein the polynomial equation expresses the resource usage as a twelfth degree polynomial function of day of year, hour of day with each independent variable having a highest degree of six, said polynomial equation having a set of calculated coefficients; and
   storing said coefficients in the memory.

2. A method according to claim 1 wherein said polynomial equation defines said resource usage coordinate value by application of said coefficients to said coordinate values for day of year and time of day.

3. A method according to claim 1 wherein the plurality of sequential events total a number of events in the range of from 8000 to 600000.

4. A method according to claim 1 wherein the data defining said plurality of sequential events is a selected one from a group consisting of resource usage data, weather data and econometric data.

5. A method according to claim 4 wherein said resource usage data is a selected one from a group consisting of electrical load data, water usage data, and communication equipment usage data.

6. A method according to claim 4 wherein said weather data is a selected one from a group consisting of temperature, humidity, wind speed, solar radiation, and degree days.

7. A method according to claim 4 wherein said econometric data is a selected one from a group consisting of commodity price, gross domestic product, and a price index.

8. An apparatus comprising:
   a computer system having a processor and memory accessible to the processor;
   executable program code stored in said memory accessibly to the processor; and
   data stored in said memory which defines a plurality of sequential events, each event being identified by three coordinate values, the three coordinate values being day of year, hour of day and resource usage;
   said program code when executed by the processor:
   generating from the stored coordinate values a three dimensional topologic surface by plotting the resource usage against the day of the year and the hour of the day in a three dimensional space;

generating a polynomial equation defining said topologic surface wherein the polynomial equation expresses the resource usage as a twelfth degree polynomial function of day of year, hour of day with each independent variable having a highest degree of six, said polynomial equation having a set of calculated coefficients; and storing said coefficients in said memory.

9. An apparatus according to claim 8 wherein said polynomial equation defines said resource usage coordinate value by application of said coefficients to said coordinate values for day of year and time of day.

10. An apparatus according to claim 8 wherein the plurality of sequential events total a number of events in the range of from 8000 to 600000.

11. An apparatus according to claim 8 wherein the data defining said plurality of sequential events is a selected one from a group consisting of resource usage data, weather data and econometric data.

12. An apparatus according to claim 11 wherein said resource usage data is a selected one from a group consisting of electrical load data, water usage data, and communication equipment usage data.

13. An apparatus according to claim 11 wherein said weather data is a selected one from a group consisting of temperature, humidity, wind speed, solar radiation, and degree days.

14. An apparatus according to claim 11 wherein said econometric data is a selected one from a group consisting of commodity price, gross domestic product, and a price index.

15. A program product comprising:

a non-transitory computer readable medium; and program code stored on said computer readable medium accessibly to a computer system which has a processor, memory accessible to the processor, and data stored in said memory which defines a plurality of sequential events, each event being identified by three coordinate values, the three coordinate values being day of year, hour of day and resource usage;

said program code when accessed by and executed on a computer system:

generating from the stored coordinate values a three dimensional topologic surface by plotting the resource usage against the day of the year and the hour of the day in a three dimensional space;

generating a polynomial equation defining said topologic surface wherein the polynomial equation expresses the resource usage as a twelfth degree polynomial function of day of year, hour of day with each independent variable having a highest degree of six, said polynomial equation having a set of calculated coefficients; and storing said coefficients in said memory.

16. A program product according to claim 15 wherein said polynomial equation defines said resource usage coordinate value by application of said coefficients to said coordinate values for day of year and time of day.

17. A program product according to claim 15 wherein the plurality of sequential events total a number of events in the range of from 8000 to 600000.

18. A program product according to claim 15 wherein the data defining said plurality of sequential events is a selected one from a group consisting of resource usage data, weather data and econometric data.

19. A program product according to claim 18 wherein said resource usage data is a selected one from a group consisting of electrical load data, water usage data, and communication equipment usage data.

20. A program product according to claim 18 wherein said weather data is a selected one from a group consisting of temperature, humidity, wind speed, solar radiation, and degree days.

21. A program product according to claim 18 wherein said econometric data is a selected one from a group consisting of commodity price, gross domestic product, and a price index.

\* \* \* \* \*